US011685362B2

(12) United States Patent
Boucharel (10) Patent No.: US 11,685,362 B2
(45) Date of Patent: Jun. 27, 2023

(54) METHOD FOR MANAGING TORQUE DISTRIBUTION IN A HYBRID VEHICLE

(71) Applicant: Vitesco Technologies GmbH, Regensburg (DE)

(72) Inventor: Paul Boucharel, Toulouse (FR)

(73) Assignee: Vitesco Technologies GmbH

(*) Notice: Subject to any disclaimer, the term of this patent is extended or adjusted under 35 U.S.C. 154(b) by 0 days.

(21) Appl. No.: 17/627,874

(22) PCT Filed: Aug. 28, 2020

(86) PCT No.: PCT/EP2020/074104
§ 371 (c)(1),
(2) Date: Jan. 18, 2022

(87) PCT Pub. No.: WO2021/043682
PCT Pub. Date: Mar. 11, 2021

(65) Prior Publication Data
US 2022/0258718 A1 Aug. 18, 2022

(30) Foreign Application Priority Data

Sep. 5, 2019 (FR) ...................................... 1909781

(51) Int. Cl.
*B60W 20/13* (2016.01)
*B60W 50/00* (2006.01)
*B60W 20/20* (2016.01)

(52) U.S. Cl.
CPC ............ *B60W 20/13* (2016.01); *B60W 50/00* (2013.01); *B60W 20/20* (2013.01);
(Continued)

(58) Field of Classification Search
CPC ...... B60W 20/13; B60W 20/20; B60W 50/00; B60W 2050/0022; B60W 2050/0028;
(Continued)

(56) References Cited

U.S. PATENT DOCUMENTS 7,369,938 B2* 5/2008 Scholl ................ G01C 21/3469
701/428
9,193,351 B2* 11/2015 Zhao ...................... B60W 10/06
(Continued)

FOREIGN PATENT DOCUMENTS

CN 106427990 A 2/2017
FR 3068322 A1 1/2019

OTHER PUBLICATIONS

Onori et al., "Adaptive Equivalent Consumption Minimization Strategy for Hyrid Electric Vehicles", Proceedings of the ASME 2010 Dynamic Systems and Control Conference, 2010, 7 pages.
(Continued)

*Primary Examiner* — Peter D Nolan
*Assistant Examiner* — Wae L Louie
(74) *Attorney, Agent, or Firm* — RatnerPrestia (57) ABSTRACT

A computer for managing the drive train of a hybrid vehicle including an internal combustion engine, an electric machine and a battery. The drive train being capable of operating in a plurality of charging or discharging modes of the battery, the computer determines a set of probabilities of activation of the mode, determines the value of the speed of the electric motor for each mode, determines a set of electrical powers of the electric machine, calculates an energy consumption reduction indicator, determines the torque requested by the driver, the value of the speed of the internal combustion engine and the speed of the vehicle, determines a torque to be applied to the electric machine, and sends a command to the electric machine on the basis of the torque to be applied to the electric machine determined.

10 Claims, 2 Drawing Sheets

(52) U.S. Cl.
CPC ............ *B60W 2050/0022* (2013.01); *B60W 2050/0028* (2013.01); *B60W 2510/0638* (2013.01); *B60W 2510/081* (2013.01); *B60W 2510/083* (2013.01); *B60W 2520/10* (2013.01); *B60W 2710/083* (2013.01)

(58) Field of Classification Search
CPC ... B60W 2510/0638; B60W 2510/081; B60W 2510/083; B60W 2520/10; B60W 2710/083
See application file for complete search history.

(56) References Cited

U.S. PATENT DOCUMENTS

| | | | | |
|---|---|---|---|---|
| 10,029,667 | B2* | 7/2018 | Granato | ................ B60W 20/00 |
| 11,312,359 | B2* | 4/2022 | Ourabah | ................ B60W 20/12 |
| 2011/0022258 | A1* | 1/2011 | Stopp | ...................... B60L 50/61 |
| | | | | 180/65.265 |
| 2012/0209462 | A1* | 8/2012 | Roos | ....................... B60L 58/15 |
| | | | | 475/5 |
| 2014/0350763 | A1* | 11/2014 | Granato | ................ B60W 10/08 |
| | | | | 701/22 |
| 2015/0046000 | A1* | 2/2015 | Zhao | .................... B60W 10/08 |
| | | | | 903/930 |
| 2022/0258718 | A1* | 8/2022 | Boucharel | ......... B60W 50/0097 |

OTHER PUBLICATIONS

International Search Report and Written Opinion for International Application No. PCT/EP2020/074104, dated Nov. 3, 2020, 9 pages.
International Search Report and Written Opinion for International Application No. PCT/EP2020/074104, dated Nov. 3, 2020, 13 pages (French).
Mertins, "Energy Assessment of Operating Strategies in the Hybrid Powertrain", Energetic Evaluation of Operating Strategies in the Hybrid Drive Train. In: Isermann R. (eds) Electronic Management of Motorized Vehicle Drives. Vieweg+Teubner, with translation, downloaded from internet at https://doi.org/10.1007/978-3-8348-9389-5 13, 2010, 38 pages.
English Translation of the Written Opinion for International Application No. PCT/EP2020/074104, dated Nov. 3, 2020, 7 pages.

* cited by examiner

METHOD FOR MANAGING TORQUE DISTRIBUTION IN A HYBRID VEHICLE

CROSS REFERENCE TO RELATED APPLICATIONS

This application is the U.S. National Phase Application of PCT International Application No. PCT/EP2020/074104, filed Aug. 28, 2020, which claims priority to French Patent Application No. 1909781, filed Sep. 5, 2019, the contents of such applications being incorporated by reference herein.

FIELD OF THE INVENTION

The invention relates to the field of controlling the drive train of a hybrid vehicle, and relates in particular to a method for managing torque distribution between an electric machine and an internal combustion engine of a vehicle in order to optimize the energy consumption of said vehicle.

BACKGROUND OF THE INVENTION

As is known, a standard hybrid vehicle solution comprises a drive train comprising an internal combustion engine, an electric machine and a storage battery.

A hybrid vehicle operates in a manner known per se in a plurality of modes. Each operating mode is characterized by either the charging or discharging of the battery, the charging rate of the battery and the torque distribution between the internal combustion engine and the electric machine.

In a known solution, a hybrid vehicle operates in three operating modes: a charging parallel hybrid mode, in which the internal combustion engine and the electric machine can operate in parallel in order to drive the wheels of the vehicle while charging the battery, a discharging parallel hybrid mode, in which the internal combustion engine and the electric machine can operate in parallel in order to drive the wheels of the vehicle with the assistance of energy supplied by the battery, and a fully electric mode, in which the vehicle operates using electrical energy supplied by the battery only.

In one variant of this known solution, the hybrid vehicle comprises a second electric machine. According to this variant, the hybrid vehicle comprises two additional operating modes to those set out above. The hybrid vehicle therefore also comprises a charging series hybrid mode, in which the internal combustion engine drives the second electric machine as a generator, creating electricity in order to charge the battery and supply the energy consumed by the electric machine driving the wheels, and a discharging series hybrid mode, in which the electric machine drives the wheels of the vehicle using the electrical energy stored in the battery, and the energy generated by the engine drives the second electric machine as a generator.

Each operating mode is characterized by a specific cost and torque distribution between the internal combustion engine and the electric machine. The cost is defined as a variation in quantity of fuel as a function of variation in energy of the battery. For example, the cost represents the quantity of fuel saved for the use of one Joule by the battery, or the quantity of fuel used for storing one Joule in the battery.

For a given hybrid vehicle, in order to know the operating mode and the torque distribution between the internal combustion engine and the electric machine, the cost for the different hybrid operating modes is first determined using predetermined cost tables. The hybrid operating mode to be applied to the vehicle is determined as a function of predetermined cost thresholds, linked to the charging or discharging state of the battery, and as a function of the costs determined. The torque distribution is then determined, for the hybrid operating mode to be applied, using predetermined torque tables.

However, the use of such predetermined cost thresholds can lead to the activation of inappropriate operating modes so that the energy consumption of the vehicle is sub-optimal. There is therefore a need for an optimized solution for determining the torque distribution and thus minimizing the energy consumption of the vehicle.

SUMMARY OF THE INVENTION

An aspect of the invention relates to a computer for managing the drive train of a hybrid vehicle comprising at least one internal combustion engine, at least one electric machine and at least one battery, said drive train being capable of operating in a plurality of modes, each mode being either a battery charging mode or a battery discharging mode, said computer being configured to:

a. determine a set of probabilities of activation of said mode as a function of:
i. a predetermined set of probabilities of occurrence of a set of triplets of values comprising the torque requested by the driver, the speed of the internal combustion engine and the speed of the vehicle,
ii. a predetermined table of cost values, said cost representing the quantity of fuel consumed for a unit of electrical energy stored by the battery in the case of the charging of the battery or the quantity of fuel saved for a unit of electrical energy consumed by the battery in the case of the discharging of the battery,
iii. and a pair of thresholds comprising a charging cost threshold and a discharging cost threshold,
b. determine the set of values of the speed of the electric machine, each speed value corresponding to a triplet,
c. for each mode, determine a set of electrical powers of the electric machine as a function of the set of activation probabilities determined, a predetermined table of torque values to be applied to the electric machine, and the speed of the electric machine determined,
d. calculate an energy consumption reduction indicator on the basis of the set of electrical powers determined and the table of cost values,
e. determine a pair of thresholds comprising a charging cost threshold and a discharging cost threshold maximizing the energy consumption reduction indicator calculated,
f. determine the torque requested by the driver, the value of the speed of the internal combustion engine and the speed of the vehicle,
g. determine a torque to be applied to the electric machine on the basis of the torque requested by the driver determined, the value of the speed of the internal combustion engine determined, the speed of the vehicle determined, the threshold pair determined, the predetermined table of torque values and the predetermined table of cost values,
h. send a command to the electric machine on the basis of the torque to be applied to the electric machine determined.

The computer makes it possible to adjust the torque threshold as a function of the probabilities of torque requested by the driver, the value of the speed of the internal combustion engine and the speed of the hybrid vehicle, in order to apply a torque to the electric machine making it possible to maximize the reduction in energy consumption, and therefore reduce the fuel consumption of the hybrid vehicle as much as possible.

Preferably, the computer is configured to determine the predetermined set of occurrence probabilities. To this end, the computer is configured to:

a. define an initial set of probabilities of occurrence of triplets of values, b. reduce each probability of occurrence of the triplets so that it is zero after a maximum of N iterations, the triplet of values not having been encountered and/or measured during these N iterations, N being a natural number, c. determine the sum of the set of probabilities of occurrence of all of the triplets, d. adjust the probability of occurrence of the triplet the values of which are closest to the current values of the torque requested by the driver, the speed of the internal combustion engine and the speed of the vehicle, so that the sum of the set of probabilities of occurrence is equal to 1.

The computer is thus configured to determine the predetermined set of occurrence probabilities so that only the triplets of values most suited to the driving and/or driver of the vehicle are taken into account, the triplets the values of which are not representative of the operation of the vehicle having a very low, or even zero, probability of occurrence.

An aspect of the invention also relates to a hybrid vehicle comprising at least one internal combustion engine, at least one electric machine, at least one battery and a computer as described above.

An aspect of the invention also relates to a method for managing the drive train of a hybrid vehicle comprising at least one internal combustion engine, at least one electric machine and at least one battery, said drive train being capable of operating in a plurality of modes, each mode being either a battery charging mode or a battery discharging mode, said method being implemented by a computer as described above, said method being noteworthy in that it comprises:

a. an iterative phase comprising the steps of:
  i. for each mode, determining a set of probabilities of activation of said mode as a function of:
    1. a predetermined set of probabilities of occurrence of a set of triplets of values comprising the torque requested by the driver, the speed of the internal combustion engine and the speed of the vehicle,
    2. a predetermined table of cost values, said cost representing the quantity of fuel consumed for a unit of electrical energy stored by the battery in the case of the charging of the battery or the quantity of fuel saved for a unit of electrical energy consumed by the battery in the case of the discharging of the battery,
    3. and a pair of thresholds comprising a charging cost threshold and a discharging cost threshold,
  ii. determining the set of values of the speed of the electric machine, each speed value corresponding to a triplet,
  iii. for each mode, determining a set of electrical powers of the electric machine as a function of the set of activation probabilities determined, a predetermined table of torque values to be applied to the electric machine, and the speed of the electric machine determined,
  iv. calculating an energy consumption reduction indicator on the basis of the set of electrical powers determined and the cost value table,
b. a phase of determining a pair of thresholds comprising a charging cost threshold and a discharging cost threshold maximizing the energy consumption reduction indicator calculated, c. a command phase comprising the steps of:
  i. determining the torque requested by the driver, the value of the speed of the internal combustion engine and the speed of the vehicle,
  ii. determining a torque to be applied to the electric machine on the basis of the torque requested by the driver determined, the value of the speed of the internal combustion engine determined, the speed of the vehicle determined, the threshold pair determined, the predetermined table of torque values and the predetermined table of cost values,
  iii. sending a command to the electric machine on the basis of the torque to be applied to the electric machine determined.

The method makes it possible to adjust the threshold pair as a function of the torque requested by the driver, the value of the speed of the internal combustion engine and the speed of the hybrid vehicle, in order to apply a torque to the electric machine making it possible to maximize the reduction in energy consumption, and in particular to reduce the fuel consumption of the hybrid vehicle as much as possible.

Preferably, during the step of determining the set of probabilities of activation of a charging mode, said charging mode is detected if the cost value, for a given triplet, is below the charging threshold.

More preferably, during the step of determining the set of probabilities of activation of a discharging mode, said discharging mode is detected if the cost value, for a given triplet, is above the discharging threshold.

Advantageously, the method comprises a preliminary phase, making it possible to determine the predetermined set of occurrence probabilities, comprising:

a. an initialization step, in which an initial set of probabilities of occurrence of triplets of values is defined, b. a reduction step, in which each probability of occurrence of the triplets is reduced so that it is zero after a maximum of N iterations, the triplet of values not having been encountered and/or measured during these N iterations, N being a natural number, c. a step of determining the sum of the set of probabilities of occurrence of all of the triplets, d. an adjustment step, in which the probability of occurrence of the triplet the values of which are closest to the current values of the torque requested by the driver, the speed of the internal combustion engine and the speed of the vehicle, is adjusted so that the sum of the set of probabilities of occurrence is equal to 1.

The method thus makes it possible to determine the predetermined set of occurrence probabilities so that only the triplets of values most suited to the driving and/or driver of the vehicle are taken into account, the triplets the values of which are not representative of the operation of the vehicle having a very low, or even zero, probability of occurrence.

Advantageously, the predetermined set of occurrence probabilities can also be predetermined, for example in the factory by the vehicle manufacturer, and stored in a memory zone of the computer.

Preferably, the energy consumption reduction indicator is defined according to the following formula:

$$B = \left(\left(\sum_{i,mode} P_{elec}^{mode}\{i\} + \overline{P_{12V}}\right) > 0\right) * \sum_{i,mode} \left(-P_{elec}^{mode}\{i\} * Tc\{i\}\right) \quad \text{[Math. 1]}$$

where mode=CH, DCH, and represents the charging or discharging operating mode of the battery, $P_{elec}^{mode}\{i\}$ represents the electrical power consumed or generated by the electric machine, for the operating mode in question and for a triplet,

[Math. 2]

$\overline{P_{12V}}$ represents the electrical power averaged over a predetermined acquisition period, corresponding to the N iterations performed in the preliminary phase, from the storage battery, consumed at 12 V by the auxiliary equipment of the vehicle, such as the power supply for the computers, the windscreen wiper motor, window lifts, etc.,

[Math. 3]

$(\Sigma_{i,mode} P_{elec}^{mode}\{i\}+\overline{P_{12V}})$ represents the electrical power used by the storage battery, and

[Math. 4]

$((\Sigma_{i,mode} P_{elec}^{mode}\{i\}+\overline{P_{12V}})>0)$ is a condition which, when it is not met, makes it possible to reject operating modes resulting in the discharging of the battery,

[Math. 5]

$\Sigma_{i,mode}(-P_{elec}^{mode}\{i\} *Tc\{i\})$ represents the expected variation in fuel consumption resulting from the selection of the mode(s) to be activated.

Preferably, the preliminary phase, the iterative phase and the determination phase are performed every second.

Preferably, the command phase is repeated every 10 milliseconds.

BRIEF DESCRIPTION OF THE DRAWINGS

Other features and advantages of aspects of the invention will become more apparent from reading the following description. This description is purely illustrative and must be read with reference to the appended drawings, in which.

DETAILED DESCRIPTION OF THE PREFERRED EMBODIMENTS

Device

Figure 1:
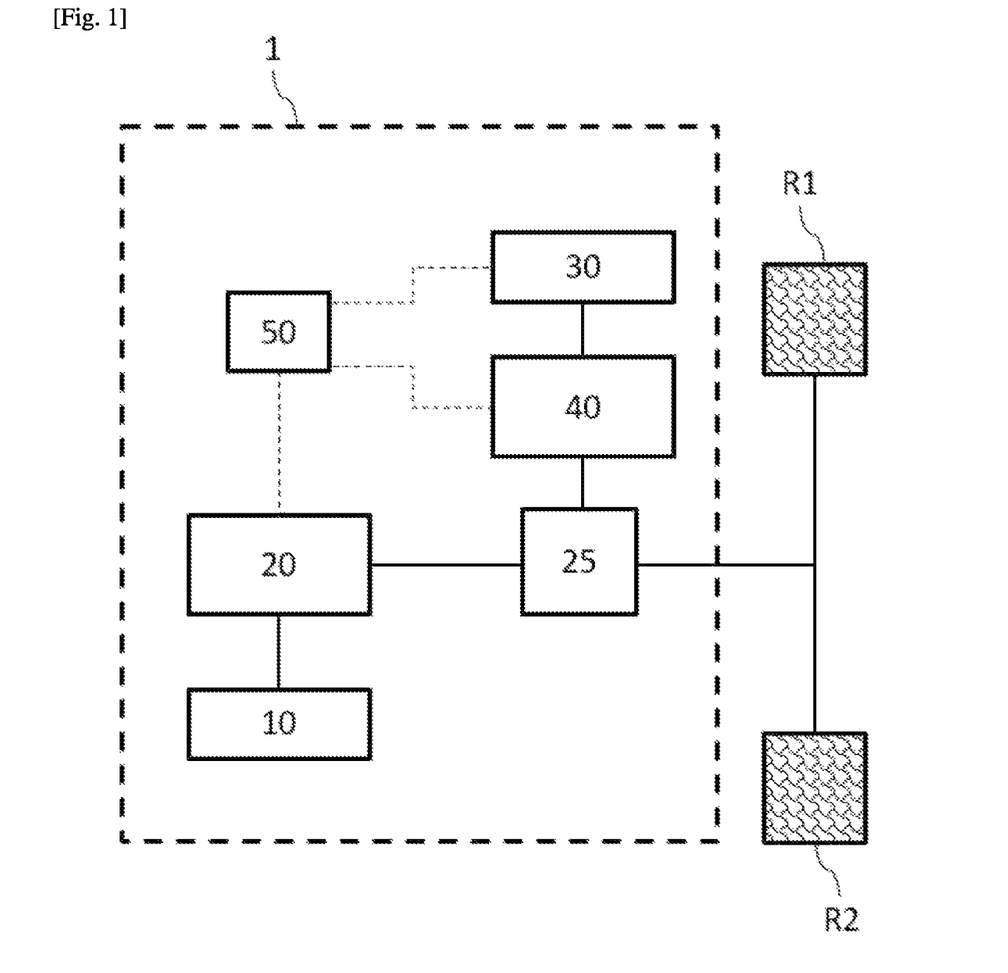
FIG. 1 illustrates one embodiment of a drive train according to an aspect of the invention.

An embodiment of the drive train of a vehicle according to the invention will be described with reference to FIG. 1. The vehicle is a hybrid vehicle, preferably a motor vehicle.

The drive train 1 makes it possible to generate the rotation of the wheels R1, R2 of the vehicle, and therefore the movement thereof. FIG. 1 shows a pair of driving wheels, but obviously the vehicle could comprise more than two driving wheels.

The drive train 1 comprises a fuel tank 10, an internal combustion engine 20, a battery 30 for storing electrical energy, and an electric machine 40, a transmission system 25 and a computer 50 for managing the drive train 1. The vehicle could however comprise more than one internal combustion engine, more than one electric machine or more than one battery, without this limiting the scope of the invention.

The fuel tank 10 is connected to the internal combustion engine 20 and supplies it with the energy necessary for the operation thereof.

The internal combustion engine 20 makes it possible to convert the thermal energy resulting from combustion of the fuel supplied by the tank 10 into mechanical energy making it possible to rotate the wheels R1, R2.

The storage battery 30 is connected to the electric machine 40 and supplies it with the electrical energy necessary for the operation thereof.

The electric machine 40 is a device making it possible to convert the electrical energy supplied by the battery 30 into mechanical energy making it possible to rotate the wheels R1, R2.

The transmission system 25 is connected between the internal combustion engine 20, the electric machine 40 and the wheels R1, R2, thus making it possible to adjust the movement of the wheels R1, R2 as a function of the torque distribution applied between the internal combustion engine 20 and the electric machine 40 and therefore as a function of the operating mode of the vehicle.

The vehicle operates in a plurality of modes. Each operating mode is characterized by the distribution of the torque between the internal combustion engine 20 and the electric machine 40, the charging rate of the battery 30, and the charging or discharging operation of the battery 30.

In the example described herein, the vehicle operates in three operating modes.

The first mode is a charging parallel hybrid mode, in which the internal combustion engine 20 drives the wheels R1, R2 of the vehicle and supplies mechanical energy to the electric machine 40, which then converts this mechanical energy received into electrical energy in order to charge the battery 30.

The second mode is a discharging parallel hybrid mode, in which the internal combustion engine 20 and the electric machine 40 can operate in parallel in order to drive the wheels R1, R2 of the vehicle with the assistance of energy supplied by the battery 30.

The third mode is a fully electric mode, in which the vehicle operates solely using electrical energy supplied by the battery 30.

According to another embodiment, the drive train 1 comprises a second electric machine 40. In addition, according to this example, the vehicle comprises two additional operating modes to the three operating modes set out above.

The fourth mode is a charging series hybrid mode, in which the internal combustion engine 20 drives the second electric machine 40 as a generator. In other words, said second electric machine 40 generates electrical energy in order to charge the battery 30 and supply electrical energy to the electric machine 40 to drive the wheels R1, R2.

The fifth mode is a discharging series hybrid mode, in which the electric machine 40 drives the wheels R1, R2 of the vehicle using the electrical energy stored in the battery 30 and the energy generated by the internal combustion engine 20 drives the second electric machine 40 as a generator. The electrical energy generated by the second electric machine 40 is entirely used by the electric machine 40 driving the wheels R1, R2.

For the charging and discharging series hybrid modes, the transmission system 25 disconnects the internal combustion engine 20 and the second electric machine 40 from the wheels R1, R2. Only one of the two electric machines can thus supply torque to the wheels R1, R2.

Each operating mode of the vehicle is characterized by a predetermined table of cost values $T_c\{i\}$, as a function of the charging state of the battery and the power of the electric machine 40, and a predetermined table of torque values $TQ\{i\}$ to be applied to the electric machine 40.

The cost $T_C\{i\}$ represents the quantity of fuel consumed for a unit of electrical energy, in particular in Joules, stored by the battery 30 in the case of the charging of the battery 30 or the quantity of fuel saved for a unit of electrical energy consumed by the battery 30 in the case of the discharging of the battery 30.

Each cost value $T_c\{i\}$ and each torque value $TQ\{i\}$ are thus determined for a triplet $\{i\}$ of values comprising the torque requested by the driver $TQ_{req}$, the speed $N_{th}$ of the internal combustion engine 20 of the vehicle and the speed $V_s$ of the vehicle, therefore $\{i\} = \{TQ_{req}, N_{th}, V_s\}$. In addition, for a given triplet $\{i\}$, the torque $TQ\{i\}$, for this triplet $\{i\}$, is predetermined as the torque that optimizes the cost $T_c\{i\}$ of said triplet $\{i\}$. In other words, the torque value $TQ\{i\}$ is predetermined so as to maximize the cost $T_c\{i\}$ for the discharging modes and minimize the cost $T_c\{i\}$ for the charging modes.

To this end, the computer 50 comprises a processor capable of implementing a set of instructions making it possible to control the actuators of the drive train 1, control the charging level of the battery 30, and send a torque setpoint command to the electric machine 40 and a fuel injection command to the internal combustion engine 20. The actuators can be the electronic clutch of the transmission system 25, the injectors or the air intake valve of the internal combustion engine 20, or the inverter of the electric machine 40.

The computer 50 is configured to determine a set of activation probabilities for each charging $p_{ch}\{i\}$ and discharging $p_{dch}\{i\}$ mode as a function of a predetermined set of probabilities of occurrence $p_{occ}\{i\}$ of a set of triplets $\{i\}$ of values.

The set of activation probabilities for each charging $p_{ch}\{i\}$ and discharging $p_{dch}\{i\}$ mode is also determined as a function of a predetermined table of cost values $T_c\{i\}$, each predetermined table corresponding to the mode in question and each cost value $T_c\{i\}$ of said table corresponding to the triplet $\{i\}$ in question.

The computer 50 is thus configured to select the charging or discharging modes that can be activated.

The computer 50 is also configured to determine the set of values of the speed $N_{elec}\{i\}$ of the electric machine 40, each speed value $N_{elec}\{i\}$ being associated with a triplet $\{i\}$ of values.

In addition, for each mode, the computer 50 is configured to determine a set of electrical powers in charging mode $P_{elec}^{CH}\{i\}$ and a set of electrical powers in discharging mode $P_{elec}^{CH}\{i\}$ of the electric machine 40 as a function of the triplet $\{i\}$ in question, the set of activation probabilities for each charging $p_{ch}\{i\}$ and discharging $p_{dch}\{i\}$ mode, a predetermined table of torque values $TQ\{i\}$ to be applied to the electric machine 40, each predetermined table corresponding to the mode in question and each torque value $TQ\{i\}$ of said table corresponding to the triplet $\{i\}$ in question, and the speed $N_{elec}\{i\}$ of the electric machine 40 determined. For guidance, the activation probabilities for charging $p_{ch}\{i\}$ or discharging modes $p_{dch}\{i\}$ that cannot be activated are zero, and the associated electrical powers are therefore also zero.

For information, for a triplet $\{i\}$ applied to the vehicle, for an operating mode, a torque $TQ\{i\}$ to be applied to the electric machine 40 is required. As the vehicle must supply the torque requested by the driver $TQ_{req}$, the torque of the internal combustion engine 20 will adjust as a function of the torque requested by the driver $TQ_{req}$ and the torque $TQ\{i\}$ to be applied to the electric machine 40 for said triplet $\{i\}$.

The computer 50 is also configured to calculate an energy consumption reduction indicator B, in particular on the basis of the set of electrical powers in charging mode or in discharging mode $P_{elec}^{CH}\{i\}$, $P_{elec}^{DCH}$ determined and the predetermined table of cost values $T_c\{i\}$.

The computer 50 is also configured to determine a pair of thresholds $S_{ch}$, $S_{dch}$ comprising a charging cost threshold $S_{ch}$ and a discharging cost threshold $S_{dch}$ maximizing the energy consumption reduction indicator B previously calculated.

The computer 50 is configured to determine the torque value requested by the driver $TQ_{req}$, in particular on the basis of the actions of the driver on the accelerator pedal, determine the value of the speed $V_s$ of the vehicle on the basis of the rotation speed of the wheels R1, R2 and receive the value of the speed $N_{th}$ of the internal combustion engine 20 from a sensor capable of measuring said value of the speed $N_{th}$.

The computer 50 is configured to determine a torque TQ to be applied to the electric machine 40 on the basis of the torque requested by the driver $TQ_{req}$ determined, the value of the speed $N_{th}$ of the internal combustion engine 20 determined, the speed $V_s$ of the vehicle determined, the threshold pair $S_{ch}$, $S_{dch}$ determined, the predetermined table of torque values $TQ\{i\}$ and the predetermined table of cost values $T_c\{i\}$. Each predetermined table is associated with an operating mode and each cost table is used to determine the consumption reduction indicator B.

To this end, the computer 50 is configured to select, from the predetermined table of torque values $TQ\{i\}$ for the mode that can be activated selected, the torque TQ to be applied, corresponding to the triplet $\{i\}$ the values of which are closest to the current values, while optimizing the cost $T_c\{i\}$. In other words, the torque value TQ to be applied is selected so as to maximize the cost $T_c\{i\}$ for the discharging modes and minimize the cost $T_c\{i\}$ for the charging modes. Generally, the triplet of closest values is unique. In the event that several triplets can be considered to be closest, the computer 50 is configured to select one arbitrarily or randomly.

Finally, the computer 50 is configured to send a command to the electric machine 40 on the basis of the torque TQ to be applied to the electric machine 40 determined.

The computer 50 comprises a memory zone in which the predetermined tables of cost values $T_c\{i\}$ are stored, each table being associated with an operating mode of the drive train 1.

The computer 50 can optionally be configured to determine the predetermined set of occurrence probabilities $p_{occ}\{i\}$.

To this end, the computer 50 is configured to define a set of probabilities $p_{occ}\{i\}$ of triplets $\{i\}$ of values, each triplet $\{i\}$ of values comprising a torque value requested by the driver $TQ_{req}$, a value of the speed $N_{th}$ of the internal combustion engine 20 of the vehicle and a value of the speed $V_s$ of the vehicle.

The computer 50 is configured to reduce each probability of occurrence $p_{occ}\{i\}$ of the triplets $\{i\}$ so that it is zero after a maximum of N iterations, the triplet $\{i\}$ of values not having been encountered and/or measured during these N iterations, N being a natural number.

The computer 50 is also configured to determine the sum $S_p$ of the set of probabilities of occurrence $p_{occ}\{i\}$ of all of the triplets $\{i\}$.

Finally, the computer 50 is configured to adjust the probability of occurrence $p_{occ}\{i\}$ of the triplet $\{i\}$ the values of which are closest to the current values of the torque requested by the driver $TQ_{req}$, the speed $N_{th}$ of the internal combustion engine 20 and the speed $V_s$ of the vehicle, so that the sum $S_p$ of the set of probabilities of occurrence $p_{occ}\{i\}$ is equal to 1.

Method

Figure 2:
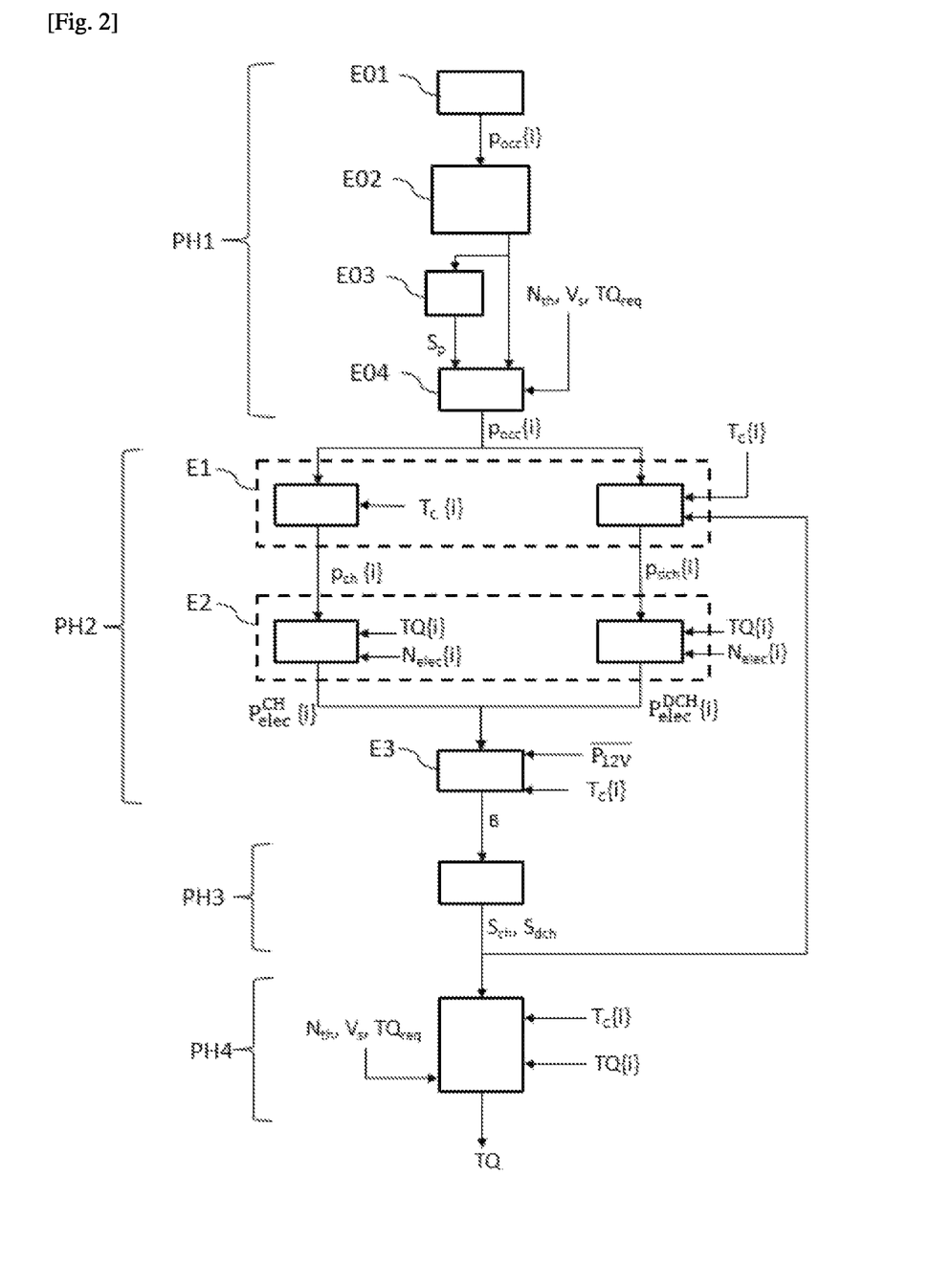
FIG. 2 illustrates one embodiment of the method according to an aspect of the invention.

An embodiment of the method for managing the drive train 1 of a hybrid vehicle as set out above and implemented by said computer 50 will now be described.

Preliminary Phase PH1

The method comprises a preliminary phase of determining a set of probabilities of occurrence $p_{occ}\{i\}$.

The set of probabilities of occurrence $p_{occ}\{i\}$ denotes the set of probabilities of occurrence of triplets $\{i\}$ of values comprising the torque requested by the driver $TQ_{req}$, the speed $N_{th}$ of the internal combustion engine 20 of the vehicle, in other words the rotation speed of the internal combustion engine 20, and the speed $V_s$ of the vehicle in the operating intervals using this triplet $\{i\}$ of values.

This set of occurrence probabilities $p_{occ}\{i\}$ can be predetermined, for example in the factory by the vehicle manufacturer, and stored in a memory zone of the computer 50.

This set can also be determined during the operation of the vehicle. An example of the determining of the set of probabilities of occurrence $p_{occ}\{i\}$ during the life of the vehicle will be described below with reference to FIG. 2, for example.

This example comprises four steps: an initialization step E01, followed by a selection step E02, followed by a determination step E03, and finally an adjustment step E04.

Initialization Step E01

During the initialization step E01, an initial and equally probable set of probabilities of occurrence $p_{occ}\{i\}$ of triplets $\{i\}$ of values is defined, the value of the torque distribution requested by the driver $TQ_{req}$ varying between the minimum torque, with a negative value, of the electric machine 40 as a generator and the sum of the maximum torque of the internal combustion engine 20 and the electric machine 40 operating in motor mode, the value of the speed $N_{th}$ of the internal combustion engine 20 varying between 0 and 6,000 revolutions per minute and the value of the speed $V_s$ of the vehicle varying between 0 and the maximum speed of the vehicle.

At least ten values are defined for each parameter. The set of probabilities of occurrence $p_{occ}\{i\}$ of the triplets $\{i\}$ of values thus comprises at least one thousand probability values.

Reduction Step E02

During the reduction step E02, each probability of occurrence $p_{occ}\{i\}$ of the triplets $\{i\}$ is reduced so that it is zero after a maximum of N iterations, the triplet $\{i\}$ of values not having been encountered or measured during these N iterations, N being a natural number. Only the triplets $\{i\}$ of values most suited to the driving and/or driver of the vehicle are thus taken into account, the triplets $\{i\}$ the values of which are not representative of the operation of the vehicle having a very low, or even zero, probability of occurrence $p_{occ}\{i\}$.

Determination Step E03

During the determination step E03, the sum $S_p$ of the set of reduced probabilities of occurrence $p_{occ}\{i\}$ of the triplets $\{i\}$ of values is produced; said sum $S_p$ is therefore defined by the following formula:

$$S_p = \Sigma_i p_{occ}\{i\}. \qquad \text{[Math. 6]}$$

As all of probabilities of occurrence $p_{occ}\{i\}$ of the triplets $\{i\}$ have been reduced, the sum $S_p$ is less than 1.

Adjustment Step E04

Next, during the adjustment step E04, the reduced probability of occurrence $p_{occ}\{i\}$ of the triplet $\{i\}$ the values of which are closest to the current values of the torque requested by the driver $TQ_{req}$, the speed $N_{th}$ of the internal combustion engine 20 and the speed $V_s$ of the vehicle, is adjusted so that the sum $S_p$ of the set of reduced probabilities of occurrence $p_{occ}\{i\}$ of the triplets $\{i\}$ of values is equal to 1. To this end, the value $(1-S_p)$ is added to the probability of occurrence $p_{occ}\{i\}$ of the triplet $\{i\}$ the values of which are closest to the current values of the torque requested by the driver $TQ_{req}$, the speed $N_{th}$ of the internal combustion engine 20 and the speed $V_s$ of the vehicle.

The set of probabilities of occurrence $p_{occ}\{i\}$ is then stored in a memory zone of the computer 50.

The preliminary phase PH1 is for example repeated every second.

An exemplary implementation of the preliminary phase PH1 will be described, in which a set of four triplets $\{i_1\}$, $\{i_2\}$, $\{i_3\}$, $\{i_4\}$ is considered, and in which the number of iterations N is equal to 5.

During the initialization step E01, all of the occurrence probabilities are initialized with equal probability. This gives: $p_{occ}(i_1)=p_{occ}(i_2)=p_{occ}(i_3)=p_{occ}(i_4)=\frac{1}{4}=0.25$.

During the reduction step E02, the value of the set of occurrence probabilities $p_{occ}\{i\}$ is reduced. As four triplets $\{i\}$ have been considered, and N=5, it is reduced by the value $1/(4*5)=0.05$. This gives: $p_{occ}(i_1)=p_{occ}(i_2)=p_{occ}(i_3)=p_{occ}(i_4)=\frac{1}{4}=0.2$.

During the determination step E03, the set of occurrence probabilities $p_{occ}\{i\}$ is added together, giving: $S_p=0.2+0.2+0.2+0.2=0.8$.

Finally, during the adjustment step E04, if the operation of the vehicle is close to the triplet $\{i_4\}$ for example, then the probability of the triplet $\{i_4\}$ is adjusted by adding to it the value $(1-S_p)$. This therefore gives $p_{occ}(i_4)=0.2+(1-0.8)=0.4$.

If the reduction step E02, the determination step E03 and the adjustment step E04 are repeated and the operation of the vehicle is still close to the triplet $\{i_4\}$, the probabilities of the triplets $\{i_1\}$, $\{i_2\}$, $\{i_3\}$ will be progressively reduced towards 0 whereas the probability of the triplet $\{i_4\}$ will tend towards 1.

Iterative Phase PH2

Said method is characterized in that it comprises an iterative phase PH2.

Determination Step E1

The iterative phase PH2 comprises a step E1 of determining the set of activation probabilities for each charging $p_{ch}\{i\}$ and discharging $p_{dch}\{i\}$ mode.

These sets are determined on the basis of the set of occurrence probabilities $p_{occ}\{i\}$ determined during the preliminary phase PH1 or by the manufacturer, and the predetermined tables of cost values $T_C\{i\}$, each predetermined table corresponding to an operating mode, and each cost value $T_C\{i\}$ corresponding to a triplet $\{i\}$ of values, said tables being stored in the memory zone.

It will be recalled that the cost $T_C$ represents the quantity of fuel consumed for a unit of electrical energy stored by the battery 30 in the case of the charging of the battery 30 or the quantity of fuel saved for a unit of electrical energy consumed by the battery 30 in the case of the discharging of the battery 30, and each cost value $T_c\{i\}$ can be defined as follows:

$$Tc\{i\} = \frac{\Delta P_{fuel}\{i\}}{\Delta P_{bat}\{i\}} \qquad \text{[Math. 7]}$$

where $\Delta P_{fuel}\{i\}$ represents the variation between the fuel consumption of the internal combustion engine 20 supplying an adjusted torque as a function of the torque requested by the driver $TQ_{req}$ and the torque TQ to be applied to the electric machine 40, when the electric machine 40 supplies torque, and the consumption of the internal combustion engine 20 if the electric machine 40 does not supply torque and the internal combustion engine 20 supplies the torque requested by the driver $TQ_{req}$ alone, $\Delta P_{bat}\{i\}$ represents the variation in power of the battery 30 between the operating mode in which the electric machine 40 supplies torque TQ{i} and the operating mode in which the electric machine 40 does not supply torque.

In this example, the set of probabilities of activation of a charging mode $p_{ch}\{i\}$ is determined for the set of triplets {i} of values. The probability of activation of a charging mode $p_{ch}\{i\}$ for a triplet {i} is determined, for each charging mode, by the following formula:

$$p_{ch}\{i\}=p_{occ}\{i\}*(T_C\{i\}<S_{ch}) \qquad \text{[Math. 8]}$$

where $S_{ch}$ denotes a predetermined charging threshold, $T_c\{i\}<S_{ch}$ is a comparison between a cost value and the predetermined charging threshold $S_{ch}$.

The comparison made is a condition making it possible to determine whether the charging operating mode can be activated for the triplet {i} of values.

For each given triplet {i}, if the condition is met, then the charging operating mode can be activated, and the probability of activation of said charging mode $p_{ch}\{i\}$ is equal to the occurrence probability $p_{occ}\{i\}$ for this triplet {i}.

If not, when the cost value $T_C\{i\}$ is above or equal to the charging cost threshold $S_{ch}$, then this means that the battery 30 is operating in a discharging mode or in a passive mode, in other words, when no current is flowing in the battery 30. The charging operating mode cannot therefore be activated and the value of the associated probability of activation of a charging mode $p_{ch}\{i\}$ is set to zero.

In addition, the set of probabilities of activation of a discharging mode $p_{dch}\{i\}$ is determined for the set of triplets {i} of values. The probability of activation of a discharging mode $p_{dch}\{i\}$ for a triplet {i} is determined, for each discharging mode, by the following formula:

$$p_{dch}\{i\}=p_{occ}\{i\}*(Tc\{i\}>S_{dch}) \qquad \text{[Math. 9]}$$

where $S_{dch}$ denotes a predetermined discharging threshold, $T_c\{i\}>S_{dch}$ is a comparison between a cost value and the predetermined discharging threshold $S_{dch}$.

The comparison made is a condition making it possible to determine whether the discharging operating mode can be activated for the triplet {i}.

For each given triplet {i}, if the condition is met, then the discharging operating mode can be activated, and the probability of activation of said discharging mode $p_{dch}\{i\}$ is equal to the occurrence probability $p_{occ}\{i\}$ for this triplet {i}.

If not, when the cost value $T_c\{i\}$ is below or equal to the discharging cost threshold $S_{dch}$, then this means that the battery 30 is operating in a charging mode or in a passive mode, in other words, when no current is flowing in the battery 30. The discharging operating mode cannot therefore be activated and the value of the associated probability of activation of the discharging mode $p_{dch}\{i\}$ is set to zero.

If several modes can be activated, a single mode will be selected and retained and the probability of activation of the other charging $p_{ch}\{i\}$ and discharging $p_{dch}\{i\}$ modes, which cannot be activated or are not selected, will be set to zero. The selected mode corresponds to the mode that has most probability of being activated for said triplet {i}.

To this end, if all of the modes that can be activated are charging modes, the mode selected is the one with the lowest cost $T_C\{i\}$.

If all of the modes that can be activated are discharging modes, the mode selected is the one with the highest cost $T_C\{i\}$.

Finally, if some of the modes that can be activated are charging modes and others are discharging modes, the mode is selected according to a predefined order of priority, which can give priority to the charging modes or to the discharging modes.

Step of Determining the Value of the Speed of the Electric Machine 40

Next, the method comprises a step of determining the set of values of the speed $N_{elec}\{i\}$ of the electric machine 40, and in particular of the speed of the rotor of said electric machine 40, each value of the speed $N_{elec}\{i\}$ corresponding to a triplet {i} of values. The set of speed values $N_{elec}\{i\}$ also corresponds to the values of the speeds $V_s$ of the vehicle used to define the set of triplets {i}.

Determination Step E2

Next, the method comprises a step E2 of determining the set of electrical powers in charging mode $P_{elec}^{CH}\{i\}$ and the set of electrical powers in discharging mode $P_{elec}^{CH}\{i\}$ of the electric machine 40, for all of the modes.

The set of electrical powers in charging mode $P_{elec}^{CH}\{i\}$ of the electric machine 40 is determined as a function of the determined set of probabilities of activation of the charging mode $p_{ch}\{i\}$, the speed $N_{elec}\{i\}$ of the electric machine 40 determined and the predetermined table of torque values TQ{i}, for the mode selected and retained. It will be recalled that the activation probabilities for charging $p_{ch}\{i\}$ or discharging $p_{dch}\{i\}$ modes that cannot be activated are zero, and the associated electrical powers are therefore also zero.

The set of electrical powers in charging mode $P_{elec}^{CH}\{i\}$ of the electric machine 40 for each triplet {i} is defined according to the following formula:

$$p_{elec}^{DCH}=p_{dch}\{i\}*P_{elec}(TQ\{i\},N_{elec}\{i\}) \qquad \text{[Math. 10]}$$

where $(P_{elec}(TQ\{i\},N_{elec}\{i\}))$ represents the electrical power of the electric machine 40 for an operating mode.

The set of electrical powers of each discharging mode $P_{elec}^{DCH}\{i\}$ of the electric machine 40 is determined as a function of the determined set of probabilities of activation of said discharging mode $p_{dch}\{i\}$, the speed $N_{elec}\{i\}$ of the electric machine 40 determined and the predetermined table of torque values TQ{i}, for the mode selected and retained.

In this example, the set of electrical powers in discharging mode $P_{elec}^{DCH}\{i\}$ of the electric machine 40 for each triplet {i} is defined according to the following formula:

$$p_{elec}^{DCH}\{i\}=p_{dch}\{i\}*P_{elec}(TQ\{i\},N_{elec}\{i\}). \qquad \text{[Math. 11]}$$

Calculation Step E3

Next, the method comprises a step E3 of calculating the fuel consumption reduction indicator B on the basis of the set of electrical powers in charging mode $P_{elec}^{CH}\{i\}$, the set of electrical powers in discharging mode $P_{elec}^{DCH}\{i\}$ of the electric machine 40 and the predetermined table of cost values $T_C\{i\}$.

The consumption reduction indicator B is defined by to the following formula:

$$B = \left(\left(\sum_{i,mode} P_{elec}^{mode}\{i\} + \overline{P_{12V}}\right) > 0\right) * \sum_{i,mode} \left(-P_{elec}^{mode}\{i\} * Tc\{i\}\right) \qquad \text{[Math. 12]}$$

where: mode=CH, DCH, and represents the charging or discharging operating mode of the battery 30, $P_{elec}^{mode}\{i\}$ represents the electrical power consumed or generated by the electric machine 40, for the operating mode in question and for a triplet $\{i\}$,

[Math. 13]

$\overline{P_{12V}}$ represents the electrical power averaged over the acquisition period, corresponding to the N iterations performed in the preliminary phase, from the storage battery 30, consumed at 12 V by the auxiliary equipment of the vehicle, such as the power supply for the computers, the windscreen wiper motor, window lifts, etc.,

[Math. 14]

$(\Sigma_{i,mode} P_{elec}^{mode}\{i\} + \overline{P_{12V}})$ represents the electrical power used by the storage battery 30, and

[Math. 15]

$((\Sigma_{i,mode} P_{elec}^{mode}\{i\} + \overline{P_{12V}}) > 0)$ is a condition which, when it is not met, makes it possible to reject operating modes resulting in the probable discharging of the battery 30,

[Math. 16]

$\Sigma_{i,mode}(-P_{elec}^{mode}\{i\} * T_C\{i\})$ represents the expected variation in fuel consumption resulting from the selection of the mode(s) to be activated and a triplet $\{i\}$.

The negative sign in the expression $-P_{elec}^{mode}\{i\} * T_C\{i\}$ makes it possible to express a reduction in fuel consumption. If the electrical power $P_{elec}^{mode}\{i\}$ is positive, then this means that electrical energy is generated by the electric machine 40. In order to generate this electrical energy, the electric machine 40 requires additional torque from the internal combustion engine 20. The internal combustion engine 20 must supply said additional torque required, and must therefore consume more fuel, in order to charge the battery 30. The expression $P_{elec}^{mode}\{i\} * T_C\{i\}$ thus represents an increase in fuel consumption. Adding a negative sign makes it possible to express a reduction in fuel consumption.

Each iteration of the iterative phase PH2 thus makes it possible to determine a value of the consumption reduction indicator B. Each iteration is for example performed every second.

Determination Phase PH3

Next, the method comprises a phase PH3 of determining the pair of thresholds comprising a charging threshold $S_{ch}$ and a discharging threshold $S_{dch}$.

During the determination phase PH3, the maximum value of the consumption reduction indicator B is selected from the set of values of the consumption reduction indicator values B calculated during the calculation step E3 of the iterative phase PH2.

A consumption reduction indicator B is associated with each pair of thresholds $S_{ch}$, $S_{dch}$. This is how the pair of thresholds $S_{ch}$, $S_{dch}$, maximizing the fuel consumption reduction indicator B calculated is determined.

Command Phase PH4

The method also comprises a phase PH4 of sending commands to the drive train 1 of the vehicle.

Determination Step

If the adjustment step E04 of the preliminary phase PH1 has been performed, then the current values of the torque requested by the driver $TQ_{req}$, the speed $N_{th}$ of the internal combustion engine 20 and the speed $V_s$ of the vehicle have already been determined.

If not, the command phase PH4 comprises a determination step, during which the current value of the torque requested by the driver $TQ_{req}$ is determined, in particular on the basis of the actions of the driver on the accelerator pedal, the current value of the speed $V_s$ of the vehicle is determined on the basis of the rotation speed of the wheels R1, R2 and the current value of the speed $N_{th}$ of the internal combustion engine 20 is determined on the basis of a sensor capable of measuring said value of the speed $N_{th}$.

Next, the operating mode(s) that can be activated are selected. To this end, the triplet $\{i\}$ considered is the one comprising the current values of the torque requested by the driver $TQ_{req}$, the speed $N_{th}$ of the internal combustion engine 20 and the speed $V_s$ of the vehicle determined previously, during the adjustment step E04 or during the determination step of the command phase PH4. The charging operating modes that can be activated correspond to the charging operating modes the cost $T_C\{i\}$ of which for the triplet $\{i\} = (TQ_{req}, N_{th}, V_s)$ is below the charging threshold $S_{ch}$ determined. The discharging operating modes that can be activated correspond to the discharging operating modes the cost $T_C\{i\}$ of which for the triplet $\{i\} = (TQ_{req}, N_{th}, V_s)$ is above the discharging threshold $S_{dch}$, determined.

If several modes can be activated, a single mode is selected. The mode is selected as described in paragraphs [0109] to [0111].

The mode selected thus makes it possible to know which predetermined table of cost values $T_c\{i\}$ and which predetermined table of torque values $TQ\{i\}$ to select and consider.

Next, the value of the torque TQ to be applied is determined by selecting, from the predetermined table of torque values $TQ\{i\}$ for the mode selected, the torque TQ to be applied, corresponding to the triplet $\{i\}$ the values of which are closest to the current values of the torque requested by the driver $TQ_{req}$, the speed $N_{th}$ of the internal combustion engine 20 and the speed $V_s$ of the vehicle, while optimizing the cost $T_c\{i\}$.

For the parallel hybrid operating modes, the torque $TQ_{th}$ of the internal combustion engine 20 is determined so that the sum of the torque $TQ_{th}$ of the internal combustion engine 20 and the torque TQ to be applied of the electric machine 40 is equal to the torque requested by the driver $TQ_{req}$.

For the series hybrid operating modes, the torque $TQ_{th}$ of the internal combustion engine 20 is the opposite of the torque TQ to be applied of the electric machine 40 operating as a generator.

Command Step

The command phase PH4 comprises a step of sending a command to the electric machine 40. To this end, the torque TQ from the torque table $TQ\{i\}$ for the operating mode selected is applied to the electric machine 40.

However, in the event that no mode can be activated, no torque command TQ is sent to the electric machine 40.

The invention claimed is:

1. A computer for managing the drive train of a hybrid vehicle comprising at least one internal combustion engineer, at least one electric machine and at least one battery, said drive train being capable of operating in a plurality of modes, each mode being either a battery charging mode or a battery discharging mode, said computer being configured to:
   a. determine a set of probabilities of activation of said mode ($p_{ch}\{i\}$, $p_{dch}\{i\}$) as a function of:
   i. a predetermined set of probabilities of occurrence ($p_{occ}\{i\}$) of a set of triplets ($\{i\}$) of values comprising the torque requested by the driver ($TQ_{req}$), the speed ($N_{th}$) of the internal combustion engine (20) and the speed ($V_s$) of the vehicle,
   ii. a predetermined table of cost values ($T_C\{i\}$), said cost ($T_C$) representing the quantity of fuel consumed for a unit of electrical energy stored by the battery in the case of the charging of the battery or the quantity of fuel saved for a unit of electrical energy consumed by the battery in the case of the discharging of the battery, iii. and a pair of thresholds comprising a charging cost threshold and a discharging cost threshold, b. determine the set of values of the speed ($N_{elec}\{i\}$) of the electric machine (40), each speed value ($N_{elec}\{i\}$) corresponding to a triplet ($\{i\}$), c. for each mode, determine a set of electrical powers ($P_{elec}^{CH}\{i\}$, $P_{elec}^{DCH}\{i\}$) of the electric machine (40) as a function of the set of activation probabilities ($p_{ch}\{i\}$, $p_{dch}\{i\}$) determined, a predetermined table of torque values ($TQ\{i\}$) to be applied to the electric machine (40), and the speed ($N_{elec}\{i\}$) of the electric machine (40) determined, d. calculate an energy consumption reduction indicator (B) on the basis of the set of electrical powers ($P_{elec}^{CH}\{i\}$, $P_{elec}^{DCH}\{i\}$) determined and the table of cost values ($T_C\{i\}$), e. determine a pair of thresholds ($S_{ch}$, $S_{dch}$) comprising a charging cost threshold ($S_{ch}$) and a discharging cost threshold ($S_{dch}$) maximizing the energy consumption reduction indicator calculated, f. determine the torque requested by the driver ($TQ_{req}$), the value of the speed ($N_{th}$) of the internal combustion engine and the speed ($V_s$) of the vehicle, g. determine a torque to be applied to the electric machine on the basis of the torque requested by the driver ($TQ_{req}$) determined, the value of the speed ($N_{th}$) of the internal combustion engine determined, the speed ($V_s$) of the vehicle determined, the threshold pair ($S_{ch}$, Sach) determined, the predetermined table of torque values ($TQ\{i\}$) and the predetermined table of cost values ($T_C\{i\}$), and h. send a command to the electric machine on the basis of the torque to be applied to the electric machine determined.

2. The computer as claimed in claim 1, being configured to determine the set of probabilities of occurrence ($p_{occ}\{i\}$); to this end, the computer is configured to:

a. define an initial set of probabilities of occurrence ($p_{occ}\{i\}$) of triplets ($\{i\}$) of values, b. reduce each probability of occurrence ($p_{occ}\{i\}$) of the triplets ($\{i\}$) so that it is zero after a maximum of N iterations, the triplet ($\{i\}$) of values not having been encountered/measured during these N iterations, N being a natural number, c. determine the sum ($S_p$) of the set of probabilities of occurrence ($p_{occ}\{i\}$) of all of the triplets ($\{i\}$), d. adjust the probability of occurrence ($p_{occ}\{i\}$) of the triplet ($\{i\}$) the values of which are closest to the current values of the torque requested by the driver ($TQ_{req}$), the speed ($N_{th}$) of the internal combustion engine and the speed ($V_s$) of the vehicle, so that the sum ($S_p$) of the set of probabilities of occurrence ($p_{occ}\{i\}$) is equal to 1.

3. A hybrid vehicle comprising at least one internal combustion engine, at least one electric machine, at least one battery and a computer as claimed in claim 1.

4. A method for managing the drive train of a hybrid vehicle comprising at least one internal combustion engine, at least one electric machine and at least one battery, said drive train being capable of operating in a plurality of modes, each mode being either a battery charging mode or a battery discharging mode, said method being implemented by a computer as claimed in claim 1, said method comprising:

a. an iterative phase comprising the steps of:

i. for each mode, determining a set of probabilities of activation of said mode ($p_{ch}\{i\}$, $p_{dch}\{i\}$) as a function of:

1. A predetermined set of probabilities of occurrence ($p_{occ}\{i\}$) of a set of triplets of values comprising the torque requested by the driver ($TQ_{req}$), the speed ($N_{th}$) of the internal combustion engine (20) of the vehicle and the speed ($V_s$) of the vehicle, 2. A predetermined table of cost values ($T_C\{i\}$), said cost ($T_C$) representing the quantity of fuel consumed for a unit of electrical energy stored by the battery in the case of the charging of the battery or the quantity of fuel saved for a unit of electrical energy consumed by the battery in the case of the discharging of the battery, 3. And a pair of thresholds ($S_{ch}$, $S_{dch}$) comprising a charging cost threshold ($S_{ch}$) and a discharging cost threshold ($S_{dch}$), ii. determining the set of values of the speed ($N_{elec}\{i\}$) of the electric machine, each speed value ($N_{elec}\{i\}$) corresponding to a triplet ($\{i\}$), iii. for each mode, determining a set of electrical powers ($P_{elec}^{CH}\{i\}$, $P_{elec}^{DCH}\{i\}$) of the electric machine (40) as a function of the set of activation probabilities ($p_{ch}\{i\}$, $p_{dch}\{i\}$) determined, a predetermined table of torque values ($TQ\{i\}$) to be applied to the electric machine, and the speed ($N_{elec}$) of the electric machine determined, iv. calculating an energy consumption reduction indicator on the basis of the set of electrical powers ($P_{elec}^{CH}\{i\}$, $P_{elec}^{DCH}\{i\}$) determined and the table of cost values ($T_C\{i\}$), b. a phase of determining a pair of thresholds ($S_{ch}$, $S_{dch}$) comprising a charging cost threshold ($S_{ch}$) and a discharging cost threshold ($S_{dch}$) maximizing the energy consumption reduction indicator calculated, c. a command phase comprising the steps of:

i. determining the torque requested by the driver ($TQ_{req}$), the value of the speed ($N_{th}$) of the internal combustion engine (20) and the speed ($V_s$) of the vehicle, ii. determining a torque to be applied to the electric machine on the basis of the torque requested by the driver ($TQ_{req}$) determined, the value of the speed ($N_{th}$) of the internal combustion engine determined, the speed ($V_s$) of the vehicle determined, the threshold pair ($S_{ch}$, $S_{dch}$) determined, the predetermined table of torque values ($TQ\{i\}$) and the predetermined table of cost values ($T_C\{i\}$), iii. sending a command to the electric machine on the basis of the torque to be applied to the electric machine determined.

5. The method as claimed in claim 4, in which, during the step of determining the set of probabilities of activation of a charging mode ($p_{ch}\{i\}$), said charging mode is detected if the cost value ($T_c\{i\}$), for a given triplet ($\{i\}$), is below the charging threshold ($S_{ch}$).

6. The method as claimed in claim 4, in which, during the step of determining the set of probabilities of activation of a discharging mode ($p_{dch}\{i\}$), said discharging mode is detected if the cost value ($T_c\{i\}$), for a given triplet ($\{i\}$), is above the discharging threshold ($S_{dch}$).

7. The method as claimed in claim 4, comprising a preliminary phase (PH1), making it possible to determine the set of probabilities of occurrence ($p_{occ}\{i\}$), comprising:
  a. an initialization step, in which an initial set of probabilities of occurrence ($p_{occ}\{i\}$) of triplets ($\{i\}$) of values is defined,
  b. a reduction step, in which each probability of occurrence ($p_{occ}\{i\}$) of the triplets ($\{i\}$) is reduced so that it is zero after a maximum of N iterations, the triplet ($\{i\}$) of values not having been encountered/measured during these N iterations, N being a natural number,
  c. a step (E03) of determining the sum ($S_p$) of the set of probabilities of occurrence ($p_{occ}\{i\}$) of all of the triplets ($\{i\}$),
  d. an adjustment step, in which the probability of occurrence ($p_{occ}\{i\}$) of the triplet ($\{i\}$) the values of which are closest to the current values of the torque requested by the driver ($TQ_{req}$), the speed ($N_{th}$) of the internal combustion engine and the speed ($V_s$) of the vehicle, is adjusted so that the sum ($S_p$) of the set of probabilities of occurrence ($p_{occ}\{i\}$) is equal to 1.

8. The method as claimed in claim 4, in which the energy consumption reduction indicator (B) is defined according to the following formula:

$$B = \left(\left(\sum_{i,mode} P_{elec}^{mode}\{i\} + \overline{P_{12V}}\right) > 0\right) * \sum_{i,mode} \left(-P_{elec}^{mode}\{i\} * Tc\{i\}\right)$$

where mode=CH, DCH, and represents the charging or discharging operating mode of the battery (30), $P_{elec}^{mode}\{i\}$ represents the electrical power consumed or generated by the electric machine (40), for the operating mode in question and for the triplet ($\{i\}$), $\overline{P_{12V}}$ represents the average electrical power from the storage battery, consumed at 12 V by the auxiliary equipment of the vehicle, such as the power supply for the computers, the windscreen wiper motor, window lifts, etc., $$\left(\sum_{i,mode} P_{elec}^{mode}\{i\} + \overline{P_{12V}}\right)$$

represents the electrical power used by the storage battery, and $$\left(\left(\sum_{i,mode} P_{elec}^{mode}\{i\} + \overline{P_{12V}}\right) > 0\right)$$

is a condition which, when it is not met, makes it possible to reject operating modes resulting in the discharging of the battery, $$\sum_{i,mode} \left(-P_{elec}^{mode}\{i\} * Tc\{i\}\right)$$

represents the expected variation in fuel consumption resulting from the selection of the mode(s) to be activated.

9. The method as claimed in claim 7, in which the preliminary phase, the iterative phase and the determination phase are performed every second.

10. The method as claimed in claim 4, in which the command phase is repeated every 10 milliseconds.

\* \* \* \* \*